United States Patent
Chasin

(10) Patent No.: US 7,313,137 B2
(45) Date of Patent: Dec. 25, 2007

(54) SYSTEM AND METHOD FOR EFFICIENT REPLICATION AND DISTRIBUTION OF DATA OBJECTS

(75) Inventor: Andrew Stephen Chasin, Los Gatos, CA (US)

(73) Assignee: International Business Machines Corp., Armonk, NY (US)

( * ) Notice: Subject to any disclaimer, the term of this patent is extended or adjusted under 35 U.S.C. 154(b) by 1020 days.

(21) Appl. No.: 10/373,760

(22) Filed: Feb. 26, 2003

(65) Prior Publication Data

US 2004/0165610 A1    Aug. 26, 2004

(51) Int. Cl.
*H04L 12/56* (2006.01)
*H04J 3/26* (2006.01)

(52) U.S. Cl. .................................. 370/390; 370/432
(58) Field of Classification Search .................. 370/390
See application file for complete search history.

(56) References Cited

U.S. PATENT DOCUMENTS

| 4,700,184 | A |   | 10/1987 | Noirel et al. |
| 5,014,265 | A |   | 5/1991 | Hahne et al. |
| 5,243,595 | A |   | 9/1993 | Woest et al. |
| 5,367,698 | A |   | 11/1994 | Webber et al. |
| 5,533,021 | A |   | 7/1996 | Branstad et al. |
| 5,544,345 | A |   | 8/1996 | Carpenter et al. |
| 5,544,347 | A |   | 8/1996 | Yanai et al. |
| 6,061,351 | A | * | 5/2000 | Erimli et al. ................ 370/390 |
| 6,542,502 | B1 | * | 4/2003 | Herring et al. ............. 370/390 |
| 6,618,373 | B1 | * | 9/2003 | Subramaniam ............. 370/390 |
| 6,628,615 | B1 | * | 9/2003 | Joseph et al. ............... 370/231 |
| 6,862,279 | B1 | * | 3/2005 | Imai et al. ................... 370/390 |
| 7,106,735 | B2 | * | 9/2006 | Yagyu et al. ............... 370/390 |
| 2002/0009082 | A1 | * | 1/2002 | Matsuoka et al. .......... 370/390 |
| 2002/0080787 | A1 | * | 6/2002 | Kim et al. ................... 370/390 |
| 2004/0008716 | A1 | * | 1/2004 | Stiliadis ...................... 370/429 |

* cited by examiner

*Primary Examiner*—Wing Chan
*Assistant Examiner*—Gregory Sefcheck
(74) *Attorney, Agent, or Firm*—Elissa Wang, SVL, IP Law

(57) ABSTRACT

A main execution thread retrieves a data object from a comparatively slow, mass storage device as a series of data blocks and stores each data block within an addressable element of a global counted list stored in memory. The main execution thread initiates a communication thread for each recipient device. Each communication thread is initialized with the network address of a corresponding recipient device and a list of addresses for the counted list elements containing the data blocks of the data object to be distributed. The communication threads operate independently and in parallel to retrieve the data object blocks from the global list for transmission to their respective recipient devices. Distribution status of each data block is maintained using a counter, associated with each addressable element, that is initiated to the total number of recipient devices and decremented each time the data block within the addressable element is transmitted.

12 Claims, 4 Drawing Sheets

SYSTEM AND METHOD FOR EFFICIENT REPLICATION AND DISTRIBUTION OF DATA OBJECTS

BACKGROUND OF THE INVENTION

1. Field of the Invention

The present invention relates to information retrieval and distribution. More particularly, the present invention relates to a new system and method for the efficient distribution of large data objects from a distribution source device to a plurality of recipient devices.

2. Description of the Related Art

In current networked data communication environments, numerous situations arise which require copying data from a distribution source device to a plurality of recipient devices. Typically, the information copied contains large data objects. For example, content management systems, that include load-balancing and/or fail-over capabilities, typically distribute information containing large data objects from a source content management server (e.g., a distribution source device) to a plurality of recipient data servers (e.g., recipient devices) connected via standard IP-based connections.

Unfortunately, conventional techniques for distributing large data objects from a distribution source device to a plurality of recipient devices are typically inefficient. For example, one conventional approach retrieves a data object from relatively slow storage (e.g., hard disk, CD-ROM, etc.) once for each recipient device. Further, such conventional approaches typically use synchronous communication techniques to send each copy of the data object to one recipient device at a time, in sequence.

Drawbacks associated with such conventional approaches are numerous. In particular, distribution of a data object to N recipient devices using such conventional approaches requires the same data object to be retrieved N-times from slow storage. This increases the number of relatively slow storage device I/O requests required to support the data object distribution process and renders the storage device unavailable for access by other executing applications during each I/O request. Therefore, increasing the number of I/O requests to a storage device increases the opportunities for storage device I/O bottlenecks to arise. Since the typical storage device requires a greater amount of time to retrieve a larger data object than a smaller data object, such bottlenecks are exacerbated when the data object retrieved N-times from the storage device is large.

Further, transmitting a data object to each recipient device in serial succession does not mitigate against delays introduced by network or recipient server latencies. For example, if any single copy of a data object is delayed during transmission due to network or recipient server latencies, all subsequent transfers of the data object are delayed. Moreover, transmitting a data object to each of a plurality of recipient devices in series does not take advantage of efficiencies that can be achieved in multi-processor environments, where multiple processors are available to execute independent tasks in parallel.

Thus, there exists a need in the art for a system that efficiently distributes large data objects from a distribution source device to a plurality of recipient devices, reduces storage device I/0 congestion, mitigates against network and recipient server latencies, and is capable of taking advantage of multi-processor parallel tasking environments.

SUMMARY OF THE INVENTION

According to the present invention, a main execution thread executing on a distribution source device retrieves a data object once from a storage device for distribution to one or more recipients. The data object is retrieved as a series of sequential data blocks. Each data block is stored within an element of a counted list residing in the global memory of the distribution source device. A counter associated with each counted list element is initialized to the number of recipient devices (N) to which the data object is to be transmitted.

The main execution thread initiates a communication thread for each recipient device that is to receive a copy of the data object. Each communication thread is initialized with the network address of an assigned recipient device and with a list of global memory addresses. The list of global memory addresses corresponds to counted list elements containing data blocks of the data object to be copied.

The communication threads operate independently and in parallel to deliver the data blocks of the distributed data object to their respective recipient devices. A communication thread retrieves a stored data block from the global counted list, transmits the retrieved data block to the communication thread's assigned recipient device and decrements the counter associated with the global counted list element in which the data block is stored. If, upon decrementing a global counted list element counter, the counter value becomes zero, the data block stored in the element is deleted from the global counted list. If all counters in the counted list are zero, the global counted list is deleted. A communication thread terminates upon transmitting the last data block associated with a data object to the corresponding assigned recipient device.

If a communication thread detects a communication error that cannot be resolved at the communication thread level, the communication thread notifies the main execution thread, decrements the global counted list counters associated with each data block for which transmission was not attempted, and self-terminates.

The present invention provides several advantages. In particular, data objects can be efficiently and expeditiously distributed regardless of the size or number of the data objects to be transferred and regardless of the number of recipient devices to which the data objects are distributed.

The present invention reduces the number of relatively slow storage device I/O requests required to support the distribution process, and frees the mass storage device for access by other executing applications, thereby potentially eliminating storage device I/O bottlenecks that typically accompany distribution processes that use conventional techniques.

The main execution and communication threads efficiently use system processor resources in a manner that is scalable to accommodate any data object distribution processing load. An increase in the number of recipient devices merely results in the initiation of a corresponding increase in communication threads. Since each communication thread operates independently to transmit a data object to a recipient device, the present invention is well suited for execution on multi-processor servers and/or clusters of processors arranged in a load sharing environment. Further, the independent and parallel operation of the communication threads mitigates the impact of network and recipient processor delays and enables a thread to execute despite errors and delays associated with other communication threads.

The partitioning of the data object identified for distribution into individually transmitted data blocks allows each data block to be removed from memory as soon as it has been delivered to each of the intended recipient devices, thereby reducing the overall memory requirements of the process. Further, access to data object data blocks is improved by storing the data blocks in individually addressable global counted list elements, thereby decreasing access delay with only a nominal increase in the use of distribution source processor memory resources. Moreover, access to the global counted list elements is controlled using the resource locking and multi-thread capabilities of the underlying programming language, thereby greatly reducing complexity at the main execution thread and communication thread level, and increasing portability across device platforms. In addition, process loads can be evenly distributed across communication threads regardless of the size of the data object and the number of recipient devices.

The above and still further features and advantages of the present invention will become apparent upon consideration of the following detailed description of specific embodiments thereof, particularly when taken in conjunction with the accompanying drawings wherein like reference numerals in the various figures are utilized to designate like components.

DETAILED DESCRIPTION OF THE PREFERRED EMBODIMENTS

Figure 1:
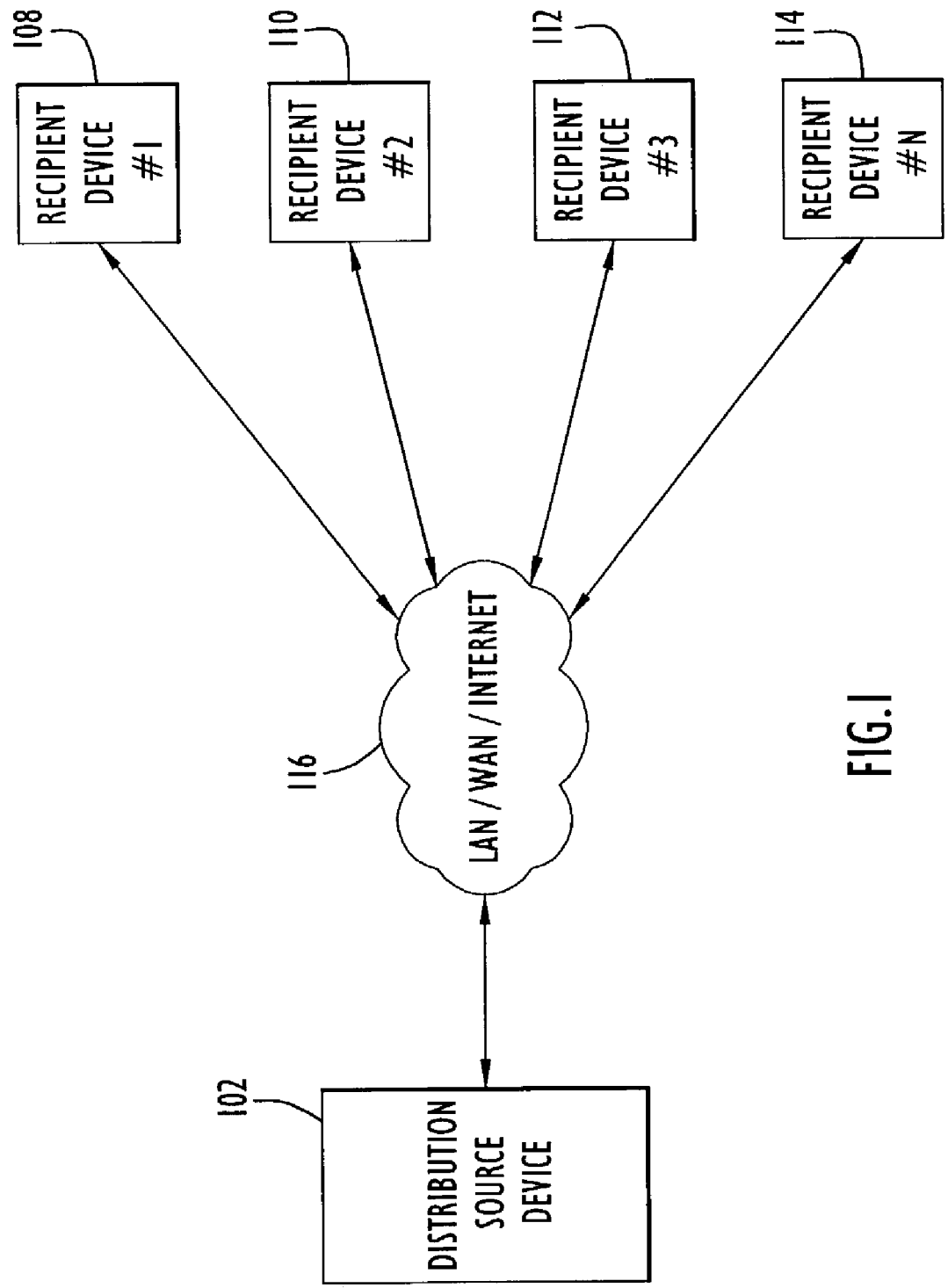
FIG. 1 is a block diagram of a system overview for distribution of data objects to recipient devices via a communication network according to the present invention.

A system for distribution of data objects to recipient devices via a network according to the present invention is illustrated in FIG. 1. Specifically, a distribution source device 102 communicates with and transfers a data object to one or more recipient devices 108, 110, 112 and 114 via a network 116. Network 116 may be implemented by a Local Area Network (LAN), Wide Area Network (WAN), and/or Internet based network.

The distribution source device can be any communication device with an addressable memory or storage device capable of storing a data object. The distribution source device is capable of establishing a communication path to a recipient device over a network and is capable of executing software that implements data object distribution as described below. The distribution source device may be implemented by a conventional personal or other suitable computer system, preferably equipped with a display or monitor, a base (e.g., including the processor memories and internal or external communications devices (e.g., modem, network cards, etc.)), a keyboard and optional mouse or other input device. Distribution source device 102 typically includes software (e.g., operating system, server software, distribution software, etc.) to communicate over network 116, and appropriate components (e.g., processor, disk storage or hard drive, etc.) having sufficient processing and storage capabilities to effectively execute the software. The distribution source device can use any of the major operating system platforms (e.g., Linux, Macintosh, Unix, OS2, Windows, Sun O/S, Solaris, etc.). The distribution source device, under software control, distributes a data object to recipient devices.

Similarly, each of the respective recipient devices can be any communication device capable of establishing a communication path with the distribution source device over a network, and capable of receiving a data object in accordance with the work-flow processes described below. A recipient device is preferably in the form of a server system and may be implemented by a conventional personal or other suitable computer system, typically equipped with a display or monitor, a base (e.g., including the processor memories and internal or external communications devices (e.g., modem, network cards, etc.)), a keyboard and optional mouse or other input device. The recipient device typically includes software (e.g., operating system, server software, etc.) to communicate over network 116, and appropriate components (e.g., processor, disk storage or hard drive, etc.) having sufficient processing and storage capabilities to effectively execute the software. The recipient device can use any of the major operating system platforms (e.g., Linux, Macintosh, Unix, OS2, Windows, Sun O/S, Solaris, etc.).

Figure 2:
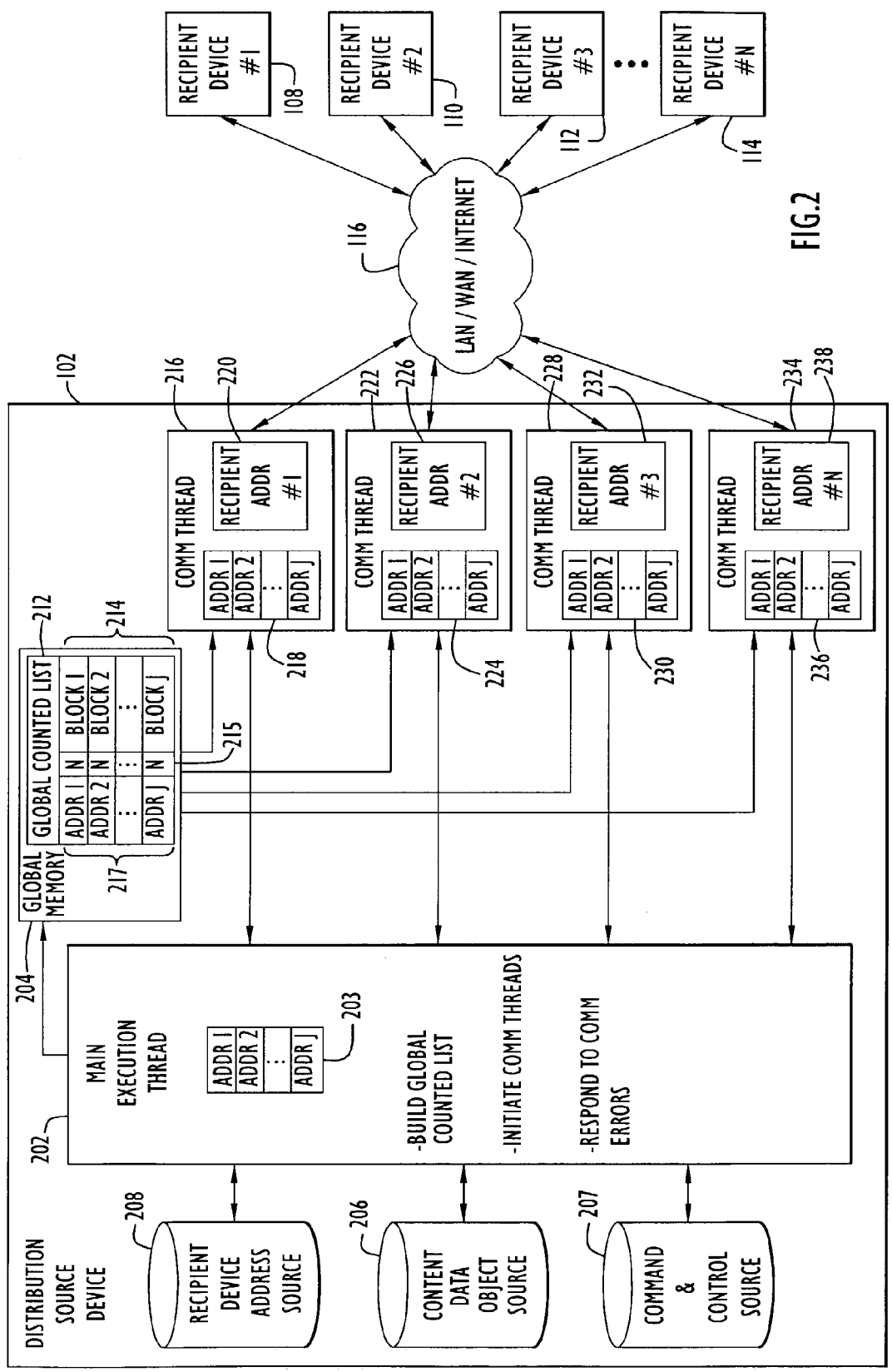
FIG. 2 is a block diagram of the distribution source device of FIG. 1 according to the present invention.

Distribution source device 102 is illustrated in FIG. 2. Specifically, distribution source device 102 includes a main execution thread 202, a global memory 204 and one or more communication threads 216, 222, 228 and 234. Main execution thread 202 controls the overall distribution process for one or more data objects. Each communication thread transmits a data object to a designated recipient device as described below. Global memory 204 is a global memory space managed by the distribution source device that is accessible to the main execution and communication threads.

When a data object is to be distributed to one or more recipient devices, in accordance with the present invention, the main execution thread receives information from a command and control source 207, a recipient device address source 208 and a content object data source 206. Main execution thread 202 uses the information received to create, in global memory 204, a globally accessible counted list 212 including counted list elements 214. Each counted list element includes an associated counted list element counter or count value 215 and a unique memory address 217. The elements of counted list 212 are used to store sequentially ordered data blocks containing K-bytes of data from the data object and basically serve as write buffers for distribution. Count value 215 associated with each addressable counted list element 214 is initialized to the total number of recipient devices that are to receive copies of the data block contained within addressable counted list element 214. The memory addresses associated with each of the respective populated counted list elements are stored in a sequentially ordered list 203, preferably in the form of a First-In-First-Out (FIFO) queue, maintained by main execution thread 202.

Main execution thread 202 initiates a communication thread for each of the N recipient devices identified to receive a copy of the distributed data object. Each communication thread is initialized with a copy of the sequential list or FIFO queue 203 and the address of a recipient device to which the communication thread is to transmit data. By way of example only, FIG. 2 illustrates four representative communication threads. Communication thread 216, initialized with sequential address list 218 and recipient address 220, communicates via network 116 to recipient device 108. Communication thread 222, initialized with sequential address list 224 and recipient address 226, communicates via network 116 to recipient device 110. Communication thread 228, initialized with sequential address list 230 and recipient address 232, communicates via network 116 to recipient device 112. Communication thread 234, initialized with sequential address list 236 and recipient address 238, communicates via network 116 to recipient device 114. Once initialized, the communication threads operate independently and in parallel to deliver the data object to their assigned recipient devices as described below. Thus, the present invention may distribute the data object to numerous recipients with only a single retrieval of the data object from storage.

Figure 3:
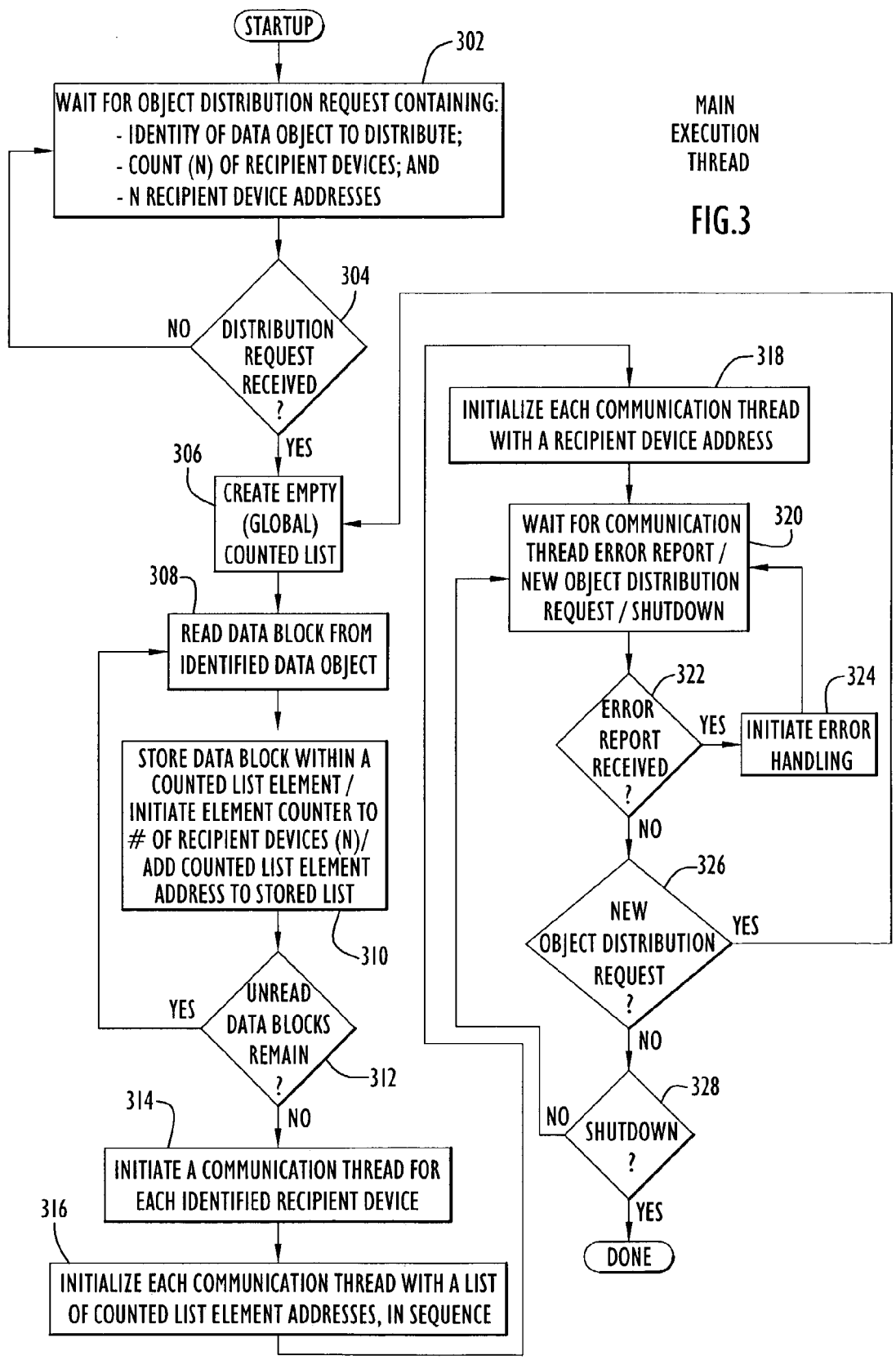
FIG. 3 is a procedural flow-chart illustrating the manner in which a main execution thread controls distribution of a data object to one or more recipient devices via communication threads according to the present invention.

The manner in which the main execution thread controls distribution of a data object to one or more recipient devices via corresponding communication threads is illustrated in FIG. 3. The main execution thread basically coordinates data object distribution. In particular, the main execution thread waits, at step 302, for an object distribution request typically including the identity of a data object to be distributed, a count (N) of the number of recipient devices, and a list of N recipient device network addresses. If an object distribution request is received at step 304, the main execution thread creates in global memory a counted list 212 (FIG. 2) at step 306.

The main execution thread subsequently retrieves the identified data object from storage 206 in incremental data blocks at step 308, each block having a maximum size of K bytes. The value K is predetermined based upon a configurable system parameter and/or can be dynamically optimized for each data object distribution based upon considerations that may include the size of the data object to be distributed, the number of recipient devices, available distribution source device resources, and/or current distribution source device processor load.

As each data block is retrieved, the main execution thread stores the data block as a counted list element 214 of the global counted list at step 310. The counter or count value associated with the counted list element is initialized to the number of recipient devices (N) scheduled to receive a copy of the data object. The address of the newly populated counted list element is added to a list 203 of sequential global counted list element addresses.

Upon determining that the last of the data blocks has been stored to the global counted list at step 312, the main execution thread initiates a communication thread at step 314 for each of the N identified recipient devices. Each communication thread is initialized with the stored sequential list of global counted list element addresses at step 316 and with the network address of the corresponding intended recipient device at step 318.

Once the main execution thread populates the global counted list and initializes a communication thread for each recipient device, the respective communication threads execute independently and in parallel to deliver a copy of the distributed data object to their assigned recipient devices. The main execution thread waits for reception of a new data object distribution request, a report from a communication thread that transmission attempts to a corresponding recipient device have failed, or an instruction to shutdown at step 320. Upon receiving a report of a transmission error at step 322, the main execution thread initiates appropriate error handling at step 324, and continues to wait at step 320. Upon receiving a request to distribute another data object at step 326, the main execution thread returns to step 306 to repeat the main execution thread process flow described above. If the main execution thread receives an instruction to shutdown at step 328, execution terminates.

Figure 4:
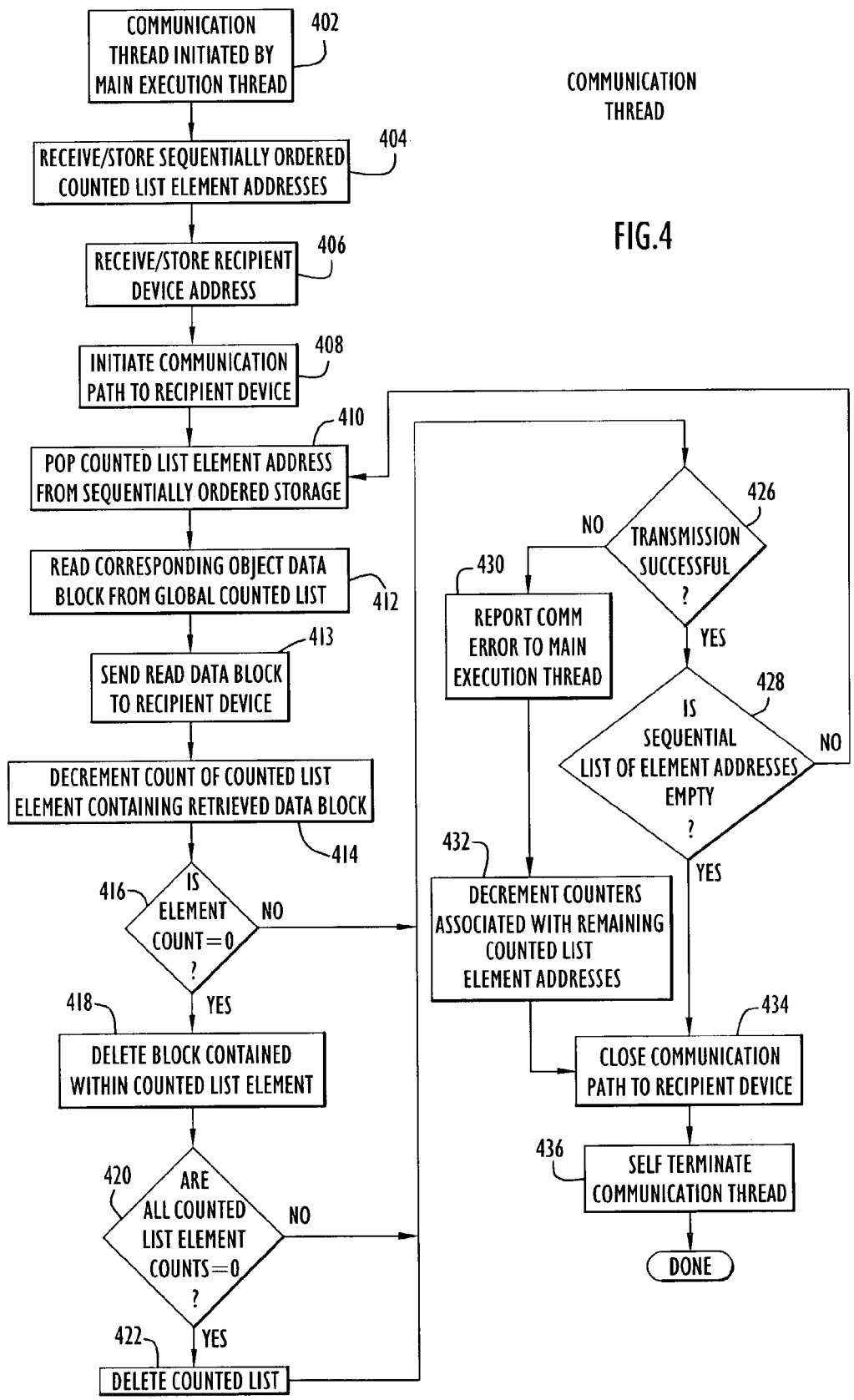
FIG. 4 is a procedural flow-chart illustrating the manner in which a communication thread controls distribution of a data object to a corresponding recipient device according to the present invention.

A communication thread handles transmission of a copy of the data object identified for distribution from the global counted list to a designated recipient device. The manner in which a communication thread controls distribution of a data object to a designated recipient device is illustrated in FIG. 4. Specifically, a communication thread is initiated by the main execution thread at step 402. The communication thread is initialized with a list (e.g., list 218 of FIG. 2) of global memory addresses at step 404 that contains an address for each element in the global counted list containing a data block. The communication thread is further initialized at step 406 with the network address of the recipient device to which the communication thread is to transmit data blocks.

The communication thread subsequently initiates communication to the recipient device at step 408 and initiates a data block transmission cycle. The communication thread removes a counted list element address from the locally stored set of sequentially ordered counted list element addresses at step 410, and uses that address to read at step 412 the data block stored in the corresponding global counted list element. Next, the communication thread proceeds to transmit the read data block to an assigned recipient device at step 413. Upon transmitting the data block, the communication thread decrements the corresponding element counter or count value at step 414.

If the decremented count value is found to be zero at step 416, the data block contained in the counted list element is no longer needed and is deleted at step 418. If all of the counted list element count values are zero, as determined at step 420, the global counted list is deleted at step 422.

If transmission is successful, as determined at step 426, and the list of sequential element addresses is not empty, as determined at step 428, the communication thread resumes processing at step 410 to process the next data block as described above. If transmission of the data block is not successful as determined at step 426, the communication thread reports to the main execution thread at step 430 the existence of a communication error. The communication thread further removes each of the element addresses remaining in the communication thread's list of global counted list element addresses and decrements the global counted list element count value associated with each of those elements at step 432.

Once the list of sequential element addresses maintained by the communication thread is empty, the communication thread closes the communication path to the assigned recipient device at step 434 and self-terminates at step 436.

It will be appreciated that the embodiments described above and illustrated in the drawings represent only a few of the many ways of implementing a system and method for efficient replication and distribution of large data objects.

The distribution source device may be of any quantity and can be implemented by any quantity of any personal or other type of computer system (e.g., PC, APPLE MACINTOSH, laptop, palm pilot, PDA, etc.). The computer system can include any commercially available operating system. The distribution source device can further include any commercially available or custom software (e.g., server software, browser software, distribution software, etc.), and various types of input devices (e.g., keyboard, mouse, voice recognition, etc.). It is to be understood that the software for the distribution source device can be implemented in any desired computer language and can be developed by one of ordinary skill in the computer arts based on the descriptions contained herein and the flow-charts illustrated in the drawings. By way of example only, the present invention distribution software may be implemented by any programming language, such as Java and 'C++,' that supports threading, thread synchronization and TCP/IP communication primitives (e.g., sockets) for communication between the communication threads and recipient devices. The computer system, alternatively, can be implemented by hardware or other processing circuitry. The various functions of the distribution source device (e.g., main execution and communication threads, etc.) can be distributed in a variety of manners among any quantity of computer or processing systems or circuitry and/or among any quantity of software and/or hardware units or modules. The software and/or algorithms described above and illustrated in the flow-charts can be modified in any manner that accomplishes the functions described herein.

The recipient device may be any communication device capable of establishing a communication path with the distribution source device over a network, and capable of receiving a data object. The recipient device may be of any quantity and can be implemented by any quantity of any personal or other type of computer system (e.g., PC, APPLE MACINTOSH, laptop, palm pilot, PDA, etc.). The computer system can include any commercially available operating system. The recipient device can further include any commercially available or custom software (e.g., server software, database software, etc.), and various types of input devices (e.g., keyboard, mouse, voice recognition, etc.). The recipient device, alternatively, can be implemented by any hardware or processing circuitry. The various functions of the recipient device (e.g., data object reception, etc.) can be distributed in a variety of manners among any quantity of computer or processing systems or circuitry and/or among any quantity of software and/or hardware units or modules.

The distribution source device and recipient device software or modules can be stored on a recorded medium (e.g., floppy diskettes, CD-ROM, memory devices, etc.) for loading on stand-alone systems or systems connected by a network, or can be downloaded (e.g., in the form of carrier waves, packets, etc.) to systems from a network.

The recipient device address source, content data object source and command and control source can be implemented by any quantity of conventional or other databases, storage units or structures (e.g., file, data structure, etc.), and can be arranged in any fashion. The command and control source, recipient device address source and content data object source can be any dynamic and/or static source of information (e.g., user instructions received via a user interface, data stored in a local or remote information base or other storage unit, local or remote executing applications, etc.).

A data object identified for distribution can be of any size ranging in size from small to very large and include any information (e.g., audio, visual, text, multi-media, etc.). For example, if a data object to be distributed contains text, the size of the object corresponds to an amount of text stored. By way of another example, if data object to be distributed contains a picture, the size of the object can depend on the pixel resolution, number of colors, and format of the stored picture. The data blocks may be any size, where the block size (K) associated with individual data blocks can be fixed, configurable, and/or determined dynamically based upon many factors including, size of the data object to be distributed, available memory resources available to the distribution source device, memory resources available to a typical recipient device, etc.

A data object can be retrieved from a content data object source as a series of sequential data blocks, a combined number of data blocks, or as an entire data object. If not retrieved in data blocks of size K, the retrieved data can be later divided into blocks of size K prior to storage within addressable memory elements accessible by communication threads, as previously described.

The list of counted list element addresses and the global counted list can be implemented by any appropriate data structures (e.g., arrays, stacks, linked list, queues, FIFO, LIFO, buffers, etc.) and may reside in the source distribution device, recipient device or other devices or systems. Further, the list of counted list element addresses is not required to be in sequential order, so long as a mechanism is provided to place the data blocks of the distributed data object into sequential order at the recipient device. For example, an information header can be added to each data block containing the data block sequence order within the data object. This header can be read and removed by a recipient header and used to reconstitute the data object regardless of the order in which the respective data blocks are received.

Counted list element addresses can use any memory address format available, including absolute memory addressing, relative memory addressing, direct index addressing, indirect index addressing and logical/sequential index addressing. Relative address offsets can be absolute or calculated based upon a number of factors including the fixed block size (K) or the actual size of each data block.

The global counted list may include or be associated with any type of counters (e.g., hardware, software, memory location or data structure, etc.) to maintain the quantity of block transmissions. The counters may be updated in any fashion (e.g., increment, decrement, etc.) and may be initialized with and count to any desired values.

The main execution thread can be used to implement distribution of a single data object or a plurality of data objects. The data objects distributed can come from a single source or plural sources. Distribution of plural data objects can be coordinated by a main communication thread simultaneously or consecutively. Error handling is not limited to error handling at the main execution thread level. Error handling can be conducted at the communication thread level, the main execution thread level, or by another application upon notification from the main execution thread that an error has occurred.

Communication threads can be initiated by a main execution thread to transmit an identified data object to a plurality of recipient devices prior to the main execution thread reading the entire data object from storage. An initiated communication thread can retrieve data blocks from global counted list addressable elements using a limited number of global counted list element addresses within its local address list. The communication thread can therefore begin transmitting data blocks associated with a data object as the data blocks of the data object are being concurrently read from the storage device and stored in the global counted list addressable elements. Such a process is possible due to the use of partitioning to divide a large data block into a plurality of data blocks that are stored in a plurality of addressable global counted list elements. This can result in a significant reduction of the memory requirements associated with the distribution of large data objects to recipient devices, since an entire data object will not need to be buffered in memory before its associated data blocks can be transmitted.

Transmission messages containing data block information can be structured using any message format. The communication path between a communication thread and a recipient device can use any communication protocol (e.g., TCP/IP, ATM, etc). Transmissions may use synchronous and/or asynchronous communication techniques and protocols. Communication threads can use different communication protocols, application interfaces, and transmission speeds, message formats, etc., to communicate with each individual recipient device based upon stored parameters or dynamically received information.

The network can be implemented by any communications network (e.g., LAN, WAN, Internet, Intranet, etc.). The distribution source device and recipient devices can include any conventional or other communications devices to communicate over the network.

The present invention is not limited to the specific applications disclosed herein, but can be used in substantially the same manner described above to distribute a data object from a source distribution device to a plurality of recipient devices for any suitable applications (e.g., database, communication, etc.).

From the foregoing description, it will be appreciated that the invention makes available a novel system and method for efficient replication and distribution of data objects, wherein a data object is retrieved once and transmitted in parallel to one or more recipient devices.

Having described preferred embodiments for a new and improved system and method for efficient replication and distribution of data objects, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of replicating and distributing a data object from a data source to a plurality of receiving devices comprising:
    (a) retrieving said data object from said data source;
    (b) storing said data object as a plurality of data blocks within a storage unit, wherein each of said plurality of data blocks is stored in a corresponding individually addressable storage unit element, and wherein each individually addressable storage unit element is associated with a corresponding counter and each address of an individually addressable storage unit element is stored in a plurality of lists each associated with a corresponding receiving device;
    (c) retrieving and transmitting to each receiving device concurrently each data block within said corresponding individually addressable storage unit elements; and
    (d) monitoring distribution of said data object to said receiving devices, wherein step (d) further includes:
        (d.1) updating said corresponding counter each time a data block stored within an individually addressable storage unit element is transmitted;
        (d.2) determining the presence of an error during transmission of a data block to a receiving device; and
        (d.3) deleting said list associated with a receiving device in response to the presence of a transmission error with respect to that receiving device and updating said counters associated with said individually addressable storage unit elements identified by addresses within said deleted list.

2. The method of claim 1, wherein step (d.1) further includes:
    (d.1.1) deleting said plurality of individually addressable storage unit elements in response to each of said counters reaching a predetermined value indicating completion of transmission of said data object to said receiving devices.

3. The method of claim 1, wherein step (c) further includes:
    (c.1) retrieving addresses of said data blocks to be transmitted from each said list to access that data block in said storage unit for transmission to said corresponding receiving device.

4. The method of claim 1, wherein said stored data blocks are transmitted to each receiving device via a network.

5. A program product apparatus including a computer readable medium with computer program logic recorded thereon for replicating and distributing a data object from a data source to a plurality of receiving devices, said program product apparatus comprising:
    a distribution control module to retrieve said data object from said data source and store said data object as a plurality of data blocks within a storage unit, wherein each of said plurality of data blocks is stored in a corresponding individually addressable storage unit element;
    a plurality of counters, each associated with a corresponding individually addressable storage unit element; and
    a plurality of distribution modules to concurrently distribute said data blocks of said data object to each receiving device and to monitor said distribution of said data object to said receiving devices, wherein each distribution module is associated with a corresponding receiving device to retrieve and transmit to that receiving device each data block within said corresponding individually addressable storage unit elements, wherein said distribution control module includes an address module to store each address of an individually addressable storage unit element in a plurality of lists each local to a corresponding distribution module, and wherein each distribution module includes:
        a counter module to update said associated counter each time a data block stored within a corresponding individually addressable storage unit element is transmitted to said corresponding receiving device;
        an error module to determine the presence of an error during transmission of a data block to said corresponding receiving device; and
        a block control module to delete said local list in response to the presence of a transmission error and to update said counters associated with said individually addressable storage unit elements identified by addresses within said deleted local list.

6. The apparatus of claim 5, wherein each distribution module further includes:
    an element module to delete said plurality of individually addressable storage unit elements in response to each of said counters reaching a predetermined value indicating completion of transmission of said data object to said receiving devices.

7. The apparatus of claim 5, wherein each distribution module further includes:
    a block module to retrieve an address of a data block to be transmitted from said local list to access that data block in said storage unit for transmission to said corresponding receiving device.

8. The apparatus of claim 5, wherein each distribution module further includes:

a transmission module to transmit stored data blocks to said corresponding receiving device via a network.

9. A system for replicating and distributing a data object from a data source to a plurality of receiving devices comprising:

a processor to replicate and distribute said data object to said receiving devices, said processor including:

a distribution control module to retrieve said data object from said data source and store said data object as a plurality of data blocks within a storage unit, wherein each of said plurality of data blocks is stored in a corresponding individually addressable storage unit element;

a plurality of counters, each associated with a corresponding individually addressable storage unit element; and a plurality of distribution modules to concurrently distribute said data blocks of said data object to each receiving device and to monitor said distribution of said data object to said receiving devices, wherein each distribution module is associated with a corresponding receiving device to retrieve and transmit to that receiving device each data block within said corresponding individually addressable storage unit elements, wherein said distribution control module includes an address module to store each address of an individually addressable storage unit element in a plurality of lists each local to a corresponding distribution module, and wherein each distribution module includes:

a counter module to update said associated counter each time a data block stored within a corresponding individually addressable storage unit element is transmitted to said corresponding receiving device;

an error module to determine the presence of an error during transmission of a data block to said corresponding receiving device; and a block control module to delete said local list in response to the presence of a transmission error and to update said counters associated with said individually addressable storage unit elements identified by addresses within said deleted local list.

10. The system of claim 9, wherein each distribution module further includes:

an element module to delete said plurality of individually addressable storage unit elements in response to each of said counters reaching a predetermined value indicating completion of transmission of said data object to said receiving devices.

11. The system of claim 9, wherein each distribution module further includes:

a block module to retrieve an address of a data block to be transmitted from said local list to access that data block in said storage unit for transmission to said corresponding receiving device.

12. The system of claim 9, wherein each distribution module further includes:

a transmission module to transmit stored data blocks to said corresponding receiving device via a network.

* * * * *